(12) United States Patent
Naraki et al.

(10) Patent No.: US 10,023,131 B2
(45) Date of Patent: Jul. 17, 2018

(54) COVERING MEMBERS

(71) Applicants: KOJIMA INDUSTRIES CORPORATION, Toyota-shi, Aichi-ken (JP); TOYOTA JIDOSHA KABUSHIKI KAISHA, Toyota-shi, Aichi-ken (JP)

(72) Inventors: Shingo Naraki, Toyota (JP); Toshinao Wada, Miyoshi (JP)

(73) Assignees: KOJIMA INDUSTRIES CORPORATION, Toyota-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 16 days.

(21) Appl. No.: 15/252,696

(22) Filed: Aug. 31, 2016

(65) Prior Publication Data
US 2017/0066388 A1 Mar. 9, 2017

(30) Foreign Application Priority Data

Sep. 4, 2015 (JP) ................................ 2015-174804

(51) Int. Cl.
*B60R 13/02* (2006.01)

(52) U.S. Cl.
CPC ...... *B60R 13/0206* (2013.01); *B60R 13/0256* (2013.01)

(58) Field of Classification Search
CPC .................. B60R 13/0206; B60R 13/0256
See application file for complete search history.

(56) References Cited

U.S. PATENT DOCUMENTS 9,561,756 B2 * 2/2017 Polovich ................. B60R 13/04

FOREIGN PATENT DOCUMENTS

| JP | H02-016331 U | 2/1990 |
|---|---|---|
| JP | H06-290605 A | 10/1994 |

* cited by examiner

*Primary Examiner* — D Glenn Dayoan
*Assistant Examiner* — Melissa A Black
(74) *Attorney, Agent, or Firm* — Conley Rose, P.C.

(57) ABSTRACT

A resin cover includes an insertion strip configured to be inserted into an insertion hole formed in an object member, and a clip configured to be fitted into an attachment hole formed in the object member. The clip is arranged and constructed to be fitted into the attachment hole of the object member while the insertion strip is inserted into the insertion hole of the object member. The insertion strip has a first rib formed therein and positioned adjacent thereto. The first rib is configured to interfere with the object member when the insertion strip is displaced laterally with respect to the insertion hole during an insertion operation of the insertion strip into the insertion hole, so as to displace the clip substantially upward or downward with respect to the attachment hole.

6 Claims, 16 Drawing Sheets

COVERING MEMBERS

This application claims benefit of Japanese patent application Serial No. 2015-174804 filed Sep. 4, 2015 which is hereby incorporated herein by reference in its entirety.

STATEMENT REGARDING FEDERALLY SPONSORED RESEARCH OR DEVELOPMENT

Not applicable.

BACKGROUND

The present disclosure relates to closure or covering members. More specifically, the present disclosure relates to closure or covering members capable of closing openings formed in a panel (e.g., an instrument panel of a vehicle).

As shown in FIG. 11, a vehicle 101 (automobile) generally has a center cluster 112 that is continuous with an instrument panel (not shown). The center cluster 112 has (right and left) side panels 114 (one of which is shown) that are made of resin and configured to cover both (right and left) sides thereof. One of the side panels 114, i.e., the left side panel 114, may have an opening 114a formed therein for maintenance of various instruments (e.g., an air conditioner, an audio device or other such devices) attached to the center cluster 112. The opening 114a is closed by a resin cover 130 (FIG. 14).

As shown in FIG. 12, the resin cover 130 has an insertion strip 132 that is formed therein. The insertion strip 132 is formed in a front end of the resin cover 130 so as to project forward. The insertion strip 132 is configured to be inserted into an insertion hole 116a formed in an attachment base or bracket 116 positioned in a front portion of the opening 114a. The attachment bracket 116 is formed in a body structure (not shown) of the vehicle 101 as a portion thereof. Further, as shown in FIG. 13, the resin cover 130 has a clamping claw 138 and a clip base 140 that are formed in an inner surface of thereof so as to project inward. The clamping claw 138 and the clip base 140 are positioned in a rear end of the resin cover 130. The clamping claw 138 is arranged and constructed to engage a support brace or pipe 118 positioned in a rear portion of the opening 114a. Further, the resin cover 130 has a clip 150 that is connected to the clip base 140 via a connecting portion (not shown) formed therein. The clip 150 has an engagement projection 150a that is arranged and constructed to be inserted or fitted into an attachment hole 120a formed in a bracket 120 attached to the support pipe 118.

In order to close the opening 114a by the resin cover 130, first, the insertion strip 132 of the resin cover 130 is inserted into the insertion hole 116a of the attachment bracket 116. Thereafter, the clamping claw 138 of the resin cover 130 is engaged with the support pipe 118 while the engagement projection 150a of the clip 150 is fitted into the attachment hole 120a formed in the bracket 120. Thus, the resin cover 130 can be attached to the left side panel 114 (FIGS. 14 and 15). As a result, the opening 114a of the left side panel 114 can be closed by the resin cover 130.

As described above, in the known art, the resin cover 130 is constructed to be attached to the left side panel 114 via the insertion strip 132, the clamping claw 138 and the clip 150. However, in the known art, even if the insertion strip 132 is not inserted into the insertion hole 116a of the attachment bracket 116 (i.e., even if a worker fails to insert the insertion strip 132 into the insertion hole 116a), the clamping claw 138 of the resin cover 130 can be engaged with the support pipe 118 while the engagement projection 150a of the clip 150 can be fitted into the attachment hole 120a formed in a bracket 120. Therefore, as shown by solid line in FIG. 16, the resin cover 130 may substantially be attached to the left side panel 114 via only the clamping claw 138 and the clip 150 (FIG. 16). That is, the resin cover 130 may substantially be attached to the left side panel 114 even if the insertion strip 132 does not function.

In a condition in which the resin cover 130 is attached to the left side panel 114 via the clamping claw 138 and the clip 150 with the insertion strip 132 not inserted into the insertion hole 116a (which condition may be referred to as "a wrong or insufficient attached condition"), the resin cover 130 may easily come off the left side panel 114 due to a vibration generated during travel of the vehicle 101. Thus, there is a need in the art for an improved resin cover for covering an opening formed in a panel.

Further, a related technique is taught by Japanese Laid-Open Utility Model Publication No. 2-16331.

SUMMARY

In one aspect of the present disclosure, a resin cover may include an insertion strip configured to be inserted into an insertion hole formed in an object member, and a clip configured to be fitted into an attachment hole formed in the object member. The clip is arranged and constructed to be fitted into the attachment hole of the object member while the insertion strip is inserted into the insertion hole of the object member. The insertion strip has a first rib formed therein and positioned adjacent thereto. The first rib is configured to interfere with the object member when the insertion strip is displaced laterally with respect to the insertion hole during an insertion operation of the insertion strip into the insertion hole, so as to displace the clip substantially upward or downward with respect to the attachment hole.

According to this aspect, during the insertion operation of the insertion strip into the insertion hole, when the insertion strip is considerably displaced with respect to the insertion hole, the first rib may interfere with an edge of the object member. Upon interference of the first rib with the object member, the resin cover may be displaced upward or downward with respect to the object member. As a result, the clip may also be displaced upward or downward with respect to the attachment hole of the object member. This means that the clip cannot be connected to the attachment hole of the object member. Therefore, the resin cover cannot be attached to the object member. Thus, a wrong or insufficient attached condition of the resin cover can be prevented.

Other objects, features and advantages will be readily understood after reading the following detailed description together with the accompanying drawings and the claims.

DETAILED DESCRIPTION

A representative embodiment of the present invention will now be described in detail with reference to FIGS. 1 to 10.

Figure 1:
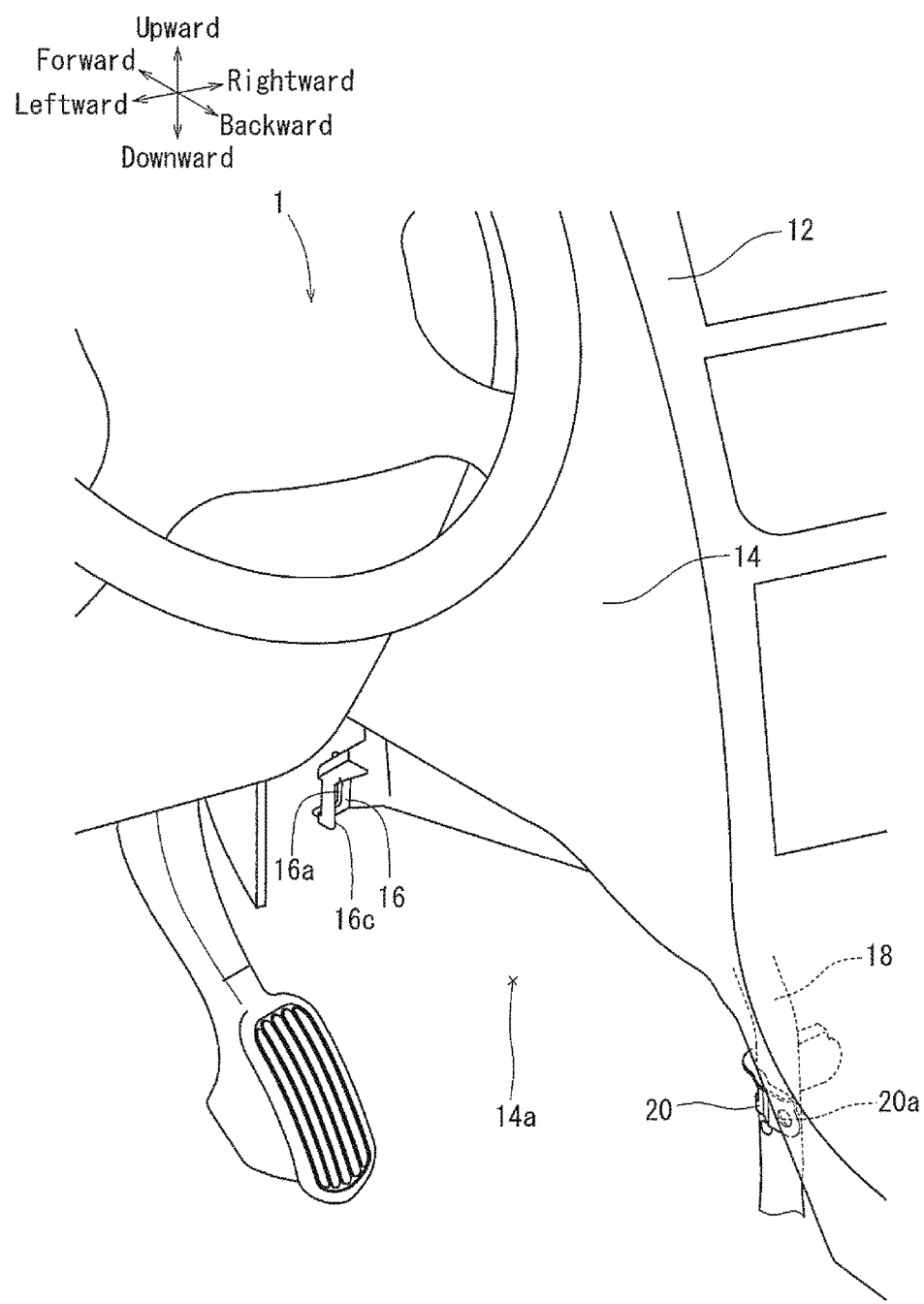
FIG. 1 is a perspective view of a vehicle cockpit having a panel to which a resin cover according to a representative embodiment of the present invention is to be attached, which shows a condition in which an opening formed in the panel is not closed by the resin cover.
Figure 4:
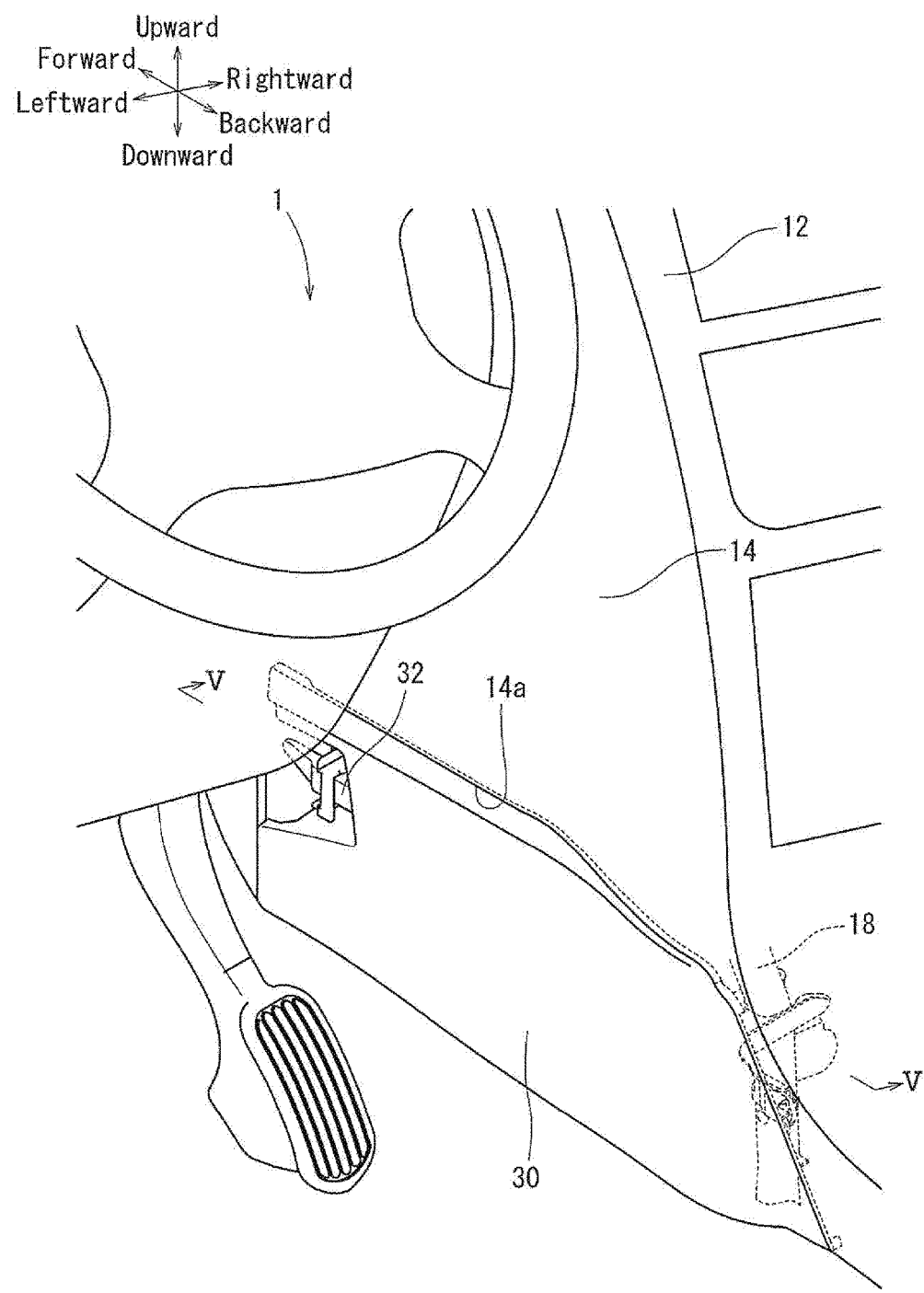
FIG. 4 is a view similar to FIG. 1, which shows a condition in which the resin cover is attached to the panel in order to close the opening formed therein.

As shown in FIG. 1, a vehicle 1 (automobile) may generally have a center cluster 12 that is continuous with an instrument panel (not shown). The center cluster 12 may have (right and left) side panels 14 (one of which is shown) that are made of resin and configured to cover both (right and left) sides thereof. One of the side panels 14, i.e., the left side panel 14, may have an opening 14a formed therein for maintenance of various instruments (e.g., an air conditioner, an audio device or other such devices) attached to the center cluster 12. As shown in FIG. 4, the opening 14a may normally be closed by a resin cover 30.

In this embodiment, the resin cover 30 may be exemplified as a closure or covering member to which the present invention is applied. Further, forward and backward, rightward and leftward, and upward and downward in the drawings may respectively correspond to forward and backward, rightward and leftward, and upward and downward of the vehicle 1.

As shown in FIG. 1, an attachment base or bracket 16 having an insertion hole 16a formed therein may be positioned in a front portion of the opening 14a. The attachment bracket 16 may constitute a portion of a body structure (not shown) of the vehicle 1. Further, the attachment bracket 16 may have a projection 16c that is formed in an outer (left) periphery thereof so as to be projected backward. Conversely, a support brace or pipe 18 having a bracket 20 attached thereto may be positioned in a rear portion of the opening 14a. Similar to the attachment bracket 16, the support pipe 18 may constitute a portion of the body structure of the vehicle 1. The bracket 20 attached to the support pipe 18 may have an attachment hole 20a formed therein. Further, the body structure of the vehicle 1 may be referred to as an object member or attaching base.

Figure 2:
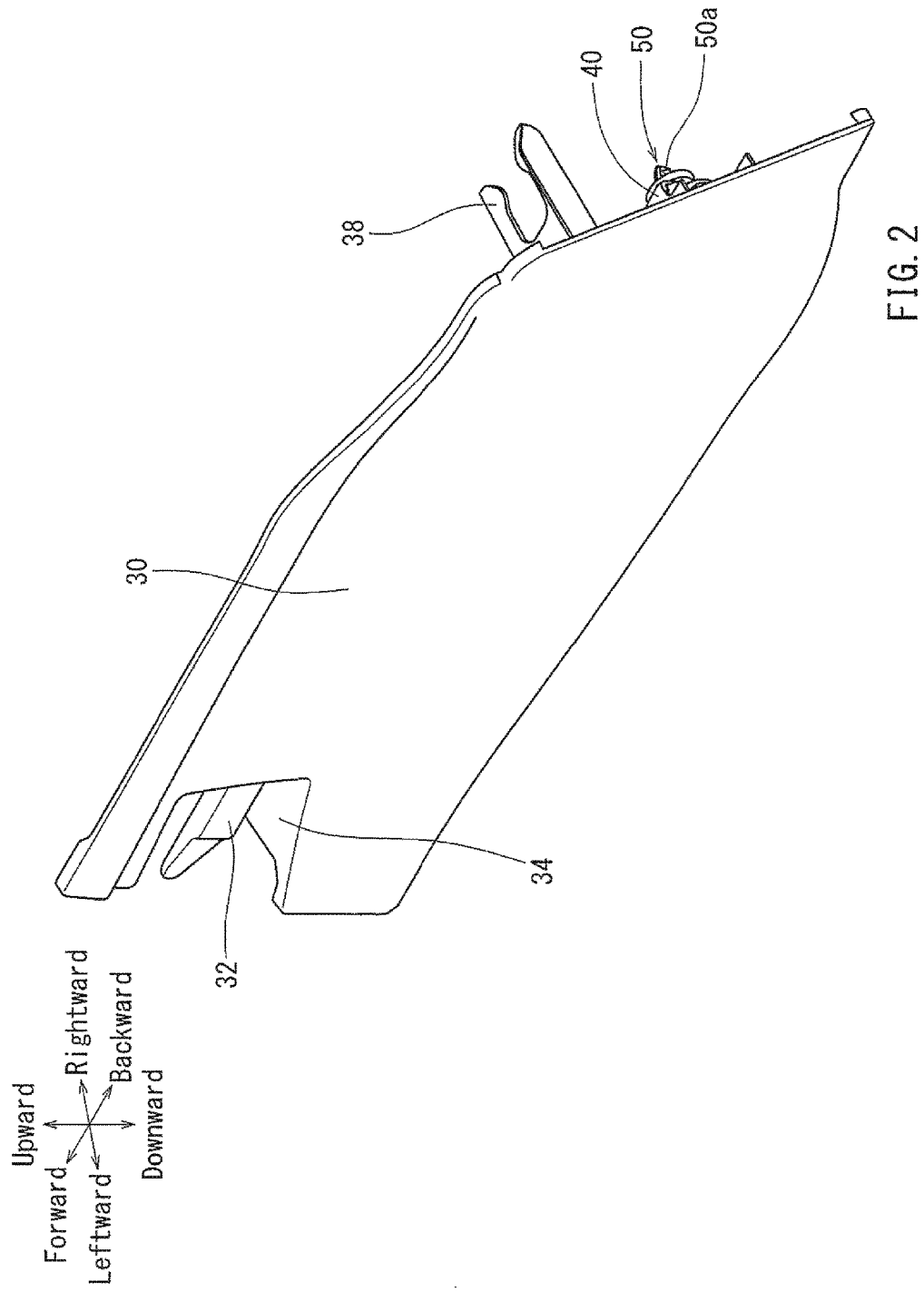
FIG. 2 is an enlarged perspective view of the resin cover.
Figure 3:
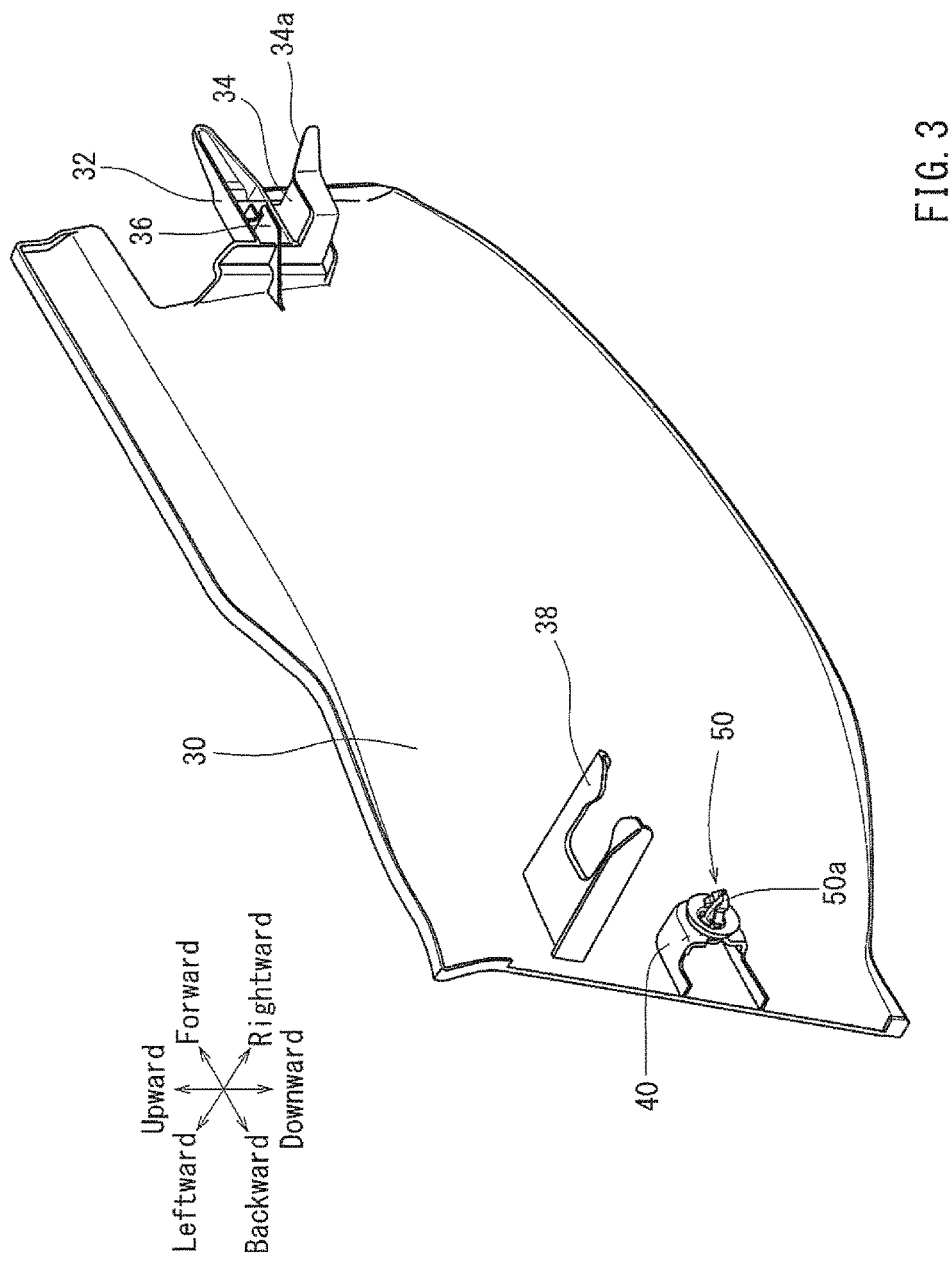
FIG. 3 is a rear view of the resin cover of FIG. 2.

The resin cover 30 may be made of resin and configured to substantially close the opening 14a of the left side panel 14. As shown in FIGS. 2 and 3, the resin cover 30 may have an insertion strip 32 that is formed in a front end of the resin cover 30 so as to project forward. The insertion strip 32 may be configured to be inserted into the insertion hole 16a of the attachment bracket 16 in a longitudinal (front-back) direction. As shown in FIG. 3, the insertion strip 32 may have a first rib 34 that is integrally formed in a lower portion thereof so as to extend inward (rightward) to a substantial extent. The first rib 34 may have an upper inclined portion 34a that is inclined forward (i.e., inclined in an insertion direction of the insertion strip 32). Further, the insertion strip 32 may have a second rib 36 that is integrally formed in an inner surface thereof so as to extend inward (rightward) to a limited extent smaller than the first rib 34.

Further, as shown in FIGS. 2 and 3, the resin cover 30 may have a clamping claw 38 and a clip base 40 that are formed in an inner surface of thereof so as to project inward. The clamping claw 38 and the clip base 40 may be positioned in a rear end of the resin cover 30. The clamping claw 38 may be arranged and constructed to engage the support pipe 18 positioned in the rear portion of the opening 14a. Further, the resin cover 30 may have a clip 50 that is connected to the clip base 40 via a connecting portion (not shown) formed therein. The clip 50 may have an engagement projection 50a that is arranged and constructed to be inserted or fitted into the attachment hole 20a of the bracket 20 in a lateral direction.

Further, the resin cover 30 including the insertion strip 32, the first rib 34, the second rib 36, the clamping claw 38 and the clip base 40 may preferably be integrally formed or molded, preferably, by resin molding.

Next, a method of attaching the resin cover 30 to the left side panel 14 in order to close the opening 14a by the resin cover 30 will now be described in detail with reference to FIGS. 4 to 10.

Figure 5:
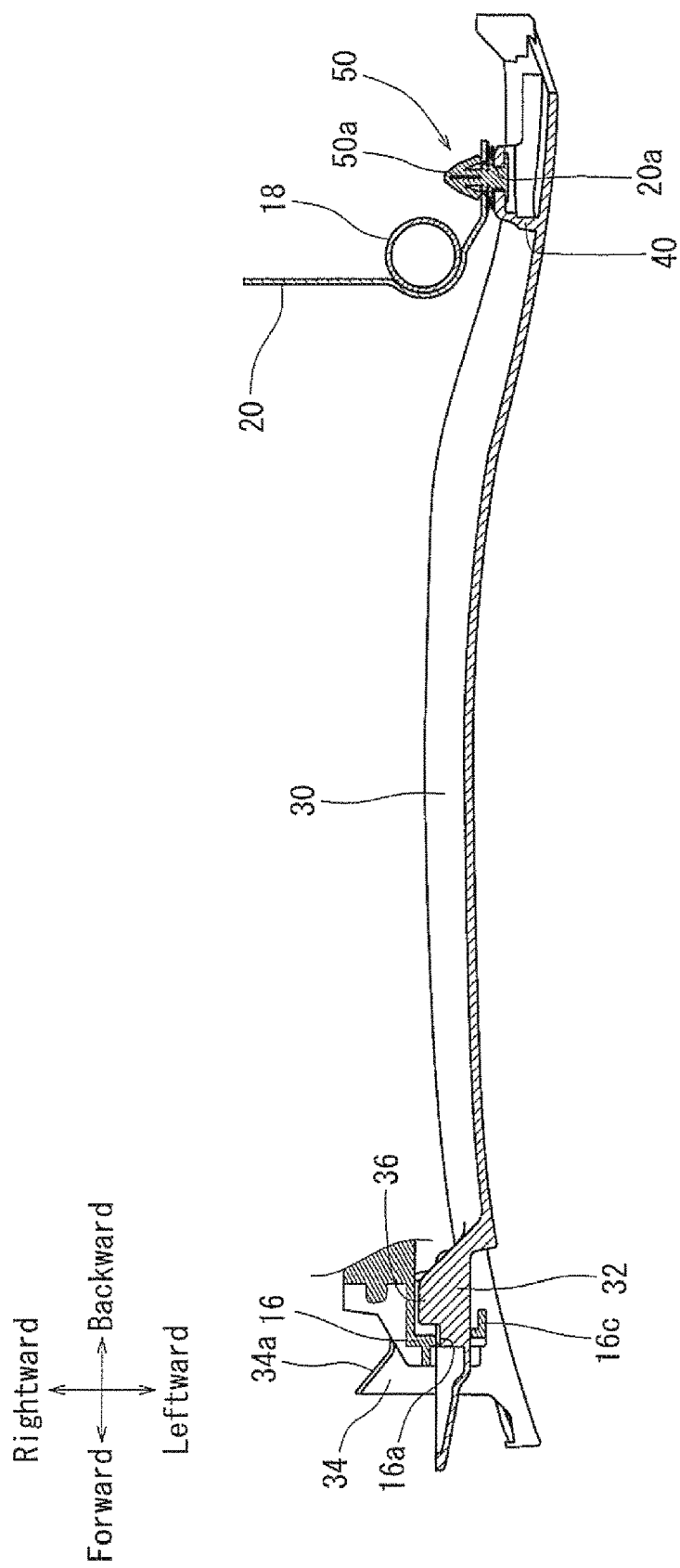
FIG. 5 is a cross-sectional view taken along line V-V in FIG. 4.
Figure 6:
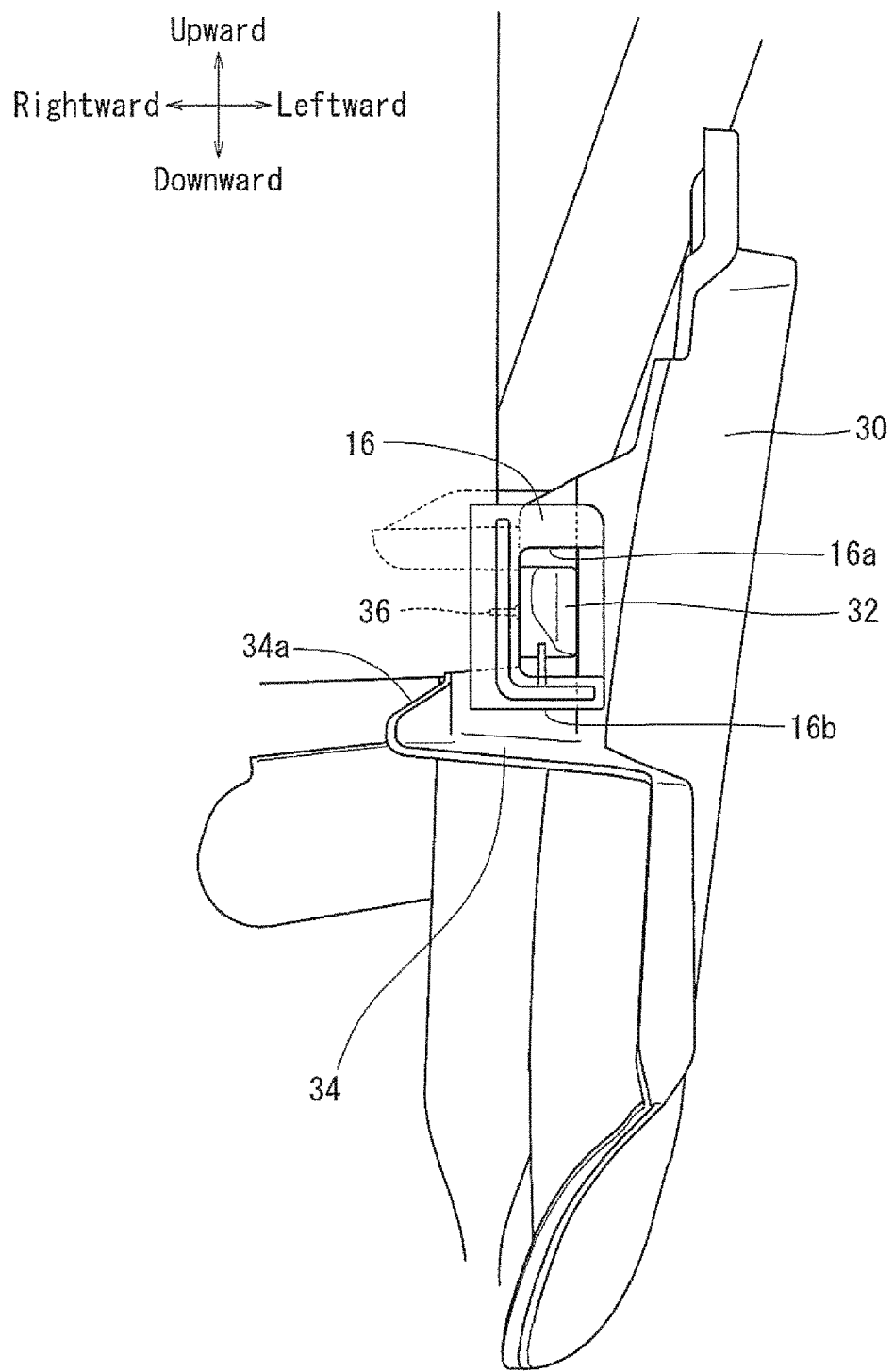
FIG. 6 is a front elevational view of FIG. 5.

First, the insertion strip 32 of the resin cover 30 may be inserted into the insertion hole 16a of the attachment bracket 16 in the longitudinal direction. Thereafter, the engagement projection 50a of the clip 50 may be fitted into the attachment hole 20a of the bracket 20 in the lateral direction while the clamping claw 38 of the resin cover 30 may be coupled to or engaged with the support pipe 18. Thus, the resin cover 30 can be attached to the left side panel 14 (FIGS. 4 to 6). As a result, the opening 14a of the left side panel 14 can be closed by the resin cover 30.

However, as shown in FIGS. 7 to 10, during an insertion operation of the insertion strip 32 of the resin cover 30 into the insertion hole 16a of the attachment bracket 16, the insertion strip 32 may not sometimes be inserted into the insertion hole 16a because the insertion strip 32 is displaced laterally or outward (leftward) with respect to the insertion hole 16a. That is, a worker may sometimes fail to insert the insertion strip 32 into the insertion hole 16a because the insertion strip 32 is displaced outward with respect to the insertion hole 16a. In such cases, the engagement projection 50a of the clip 50 may be effectively prevented from being fitted into the attachment hole 20a formed in the bracket 20. As a result, the resin cover 30 cannot be attached to the left side panel 14.

Figure 7:
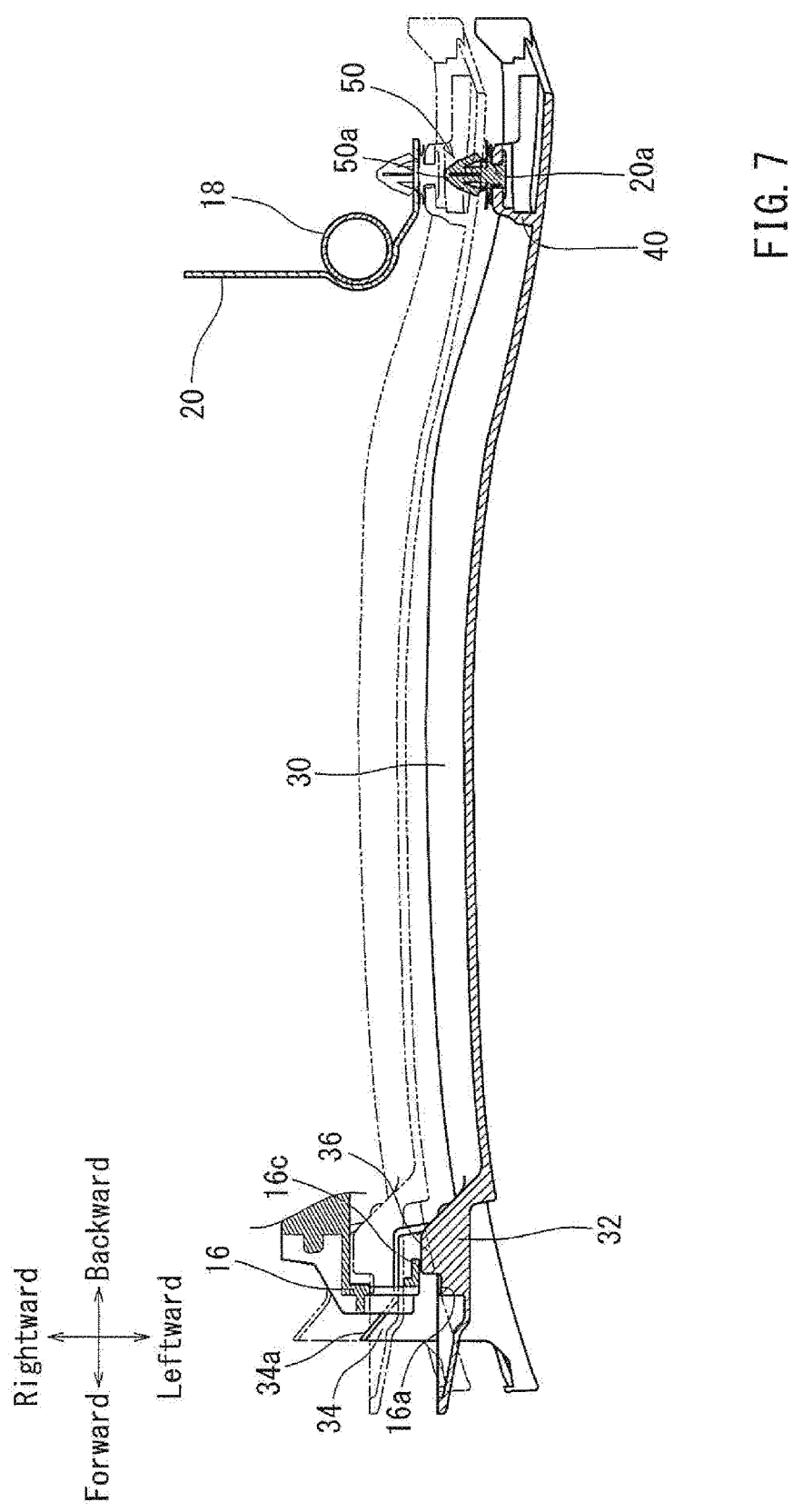
FIG. 7 is a view similar to FIG. 5, which shows a condition in which the resin cover cannot be attached to the panel because an insertion strip formed in the resin cover is not inserted into an insertion hole formed in an attachment bracket while the insertion strip is considerably displaced (leftward) with respect to the insertion hole.
Figure 8:
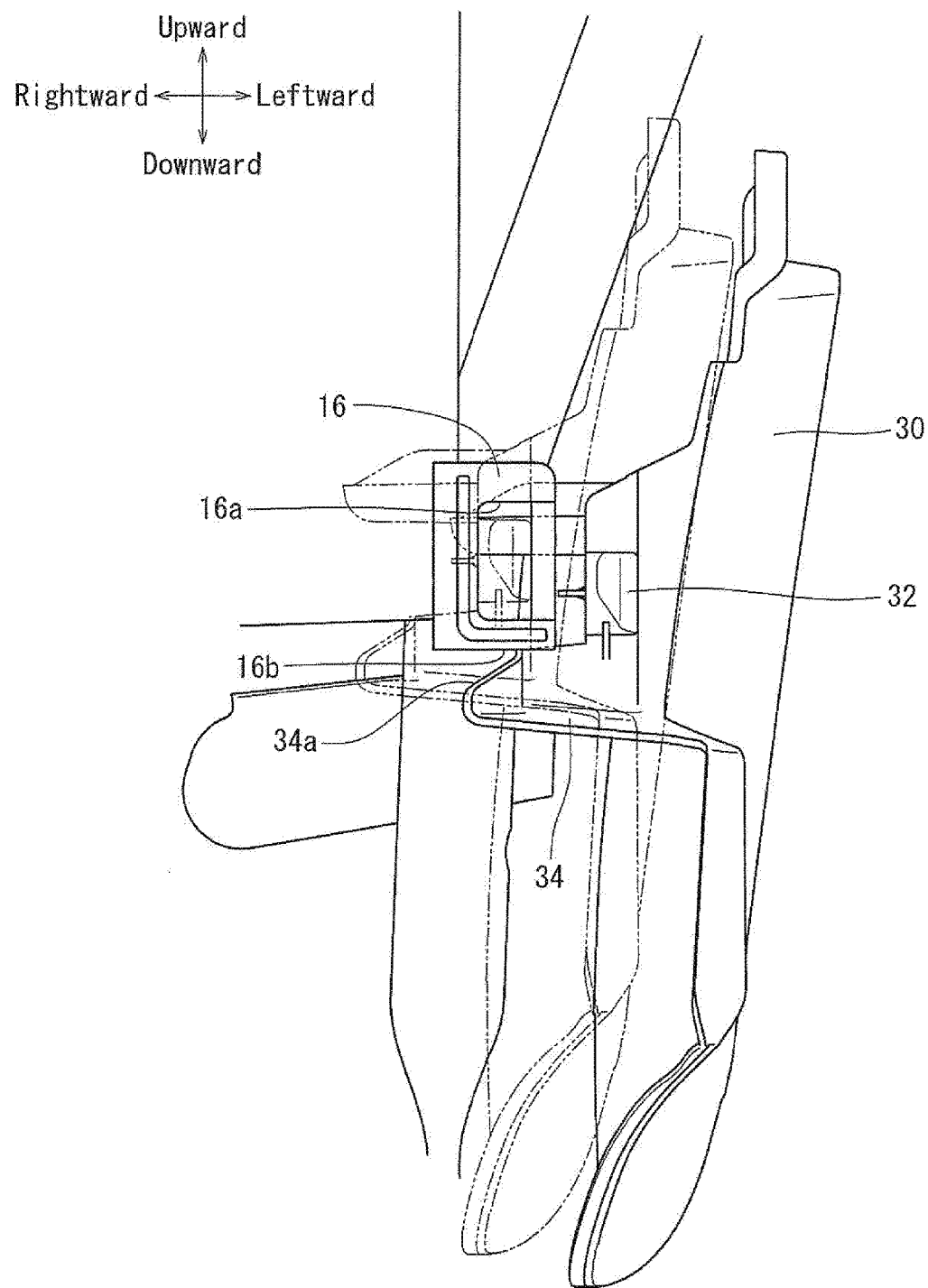
FIG. 8 is a front elevational view of FIG. 7.
Figure 9:
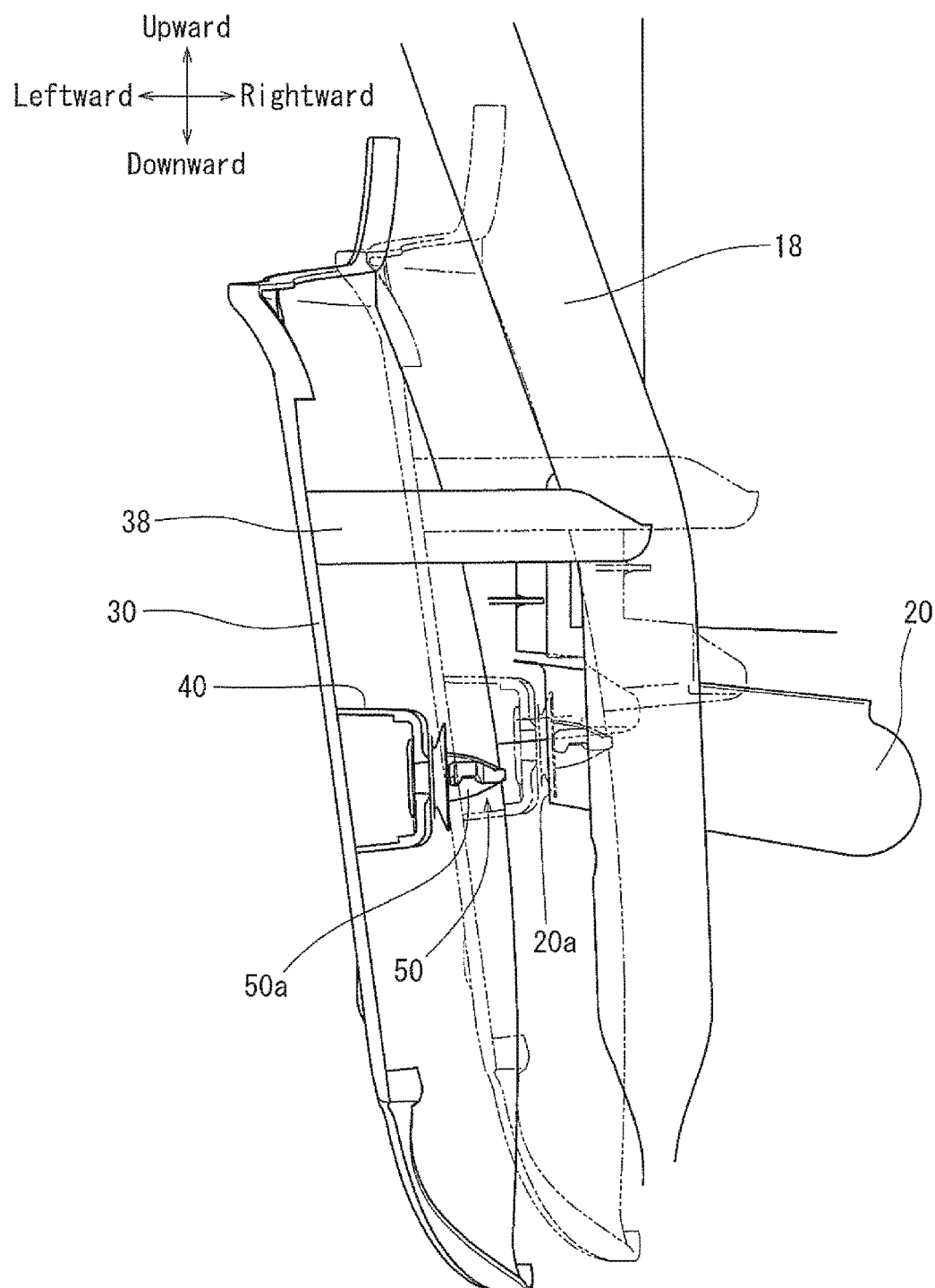
FIG. 9 is a rear elevational view of FIG. 7.

In particular, as shown in FIGS. 7 to 9, during the insertion operation of the insertion strip 32 into the insertion hole 16a, the insertion strip 32 may sometimes be displaced outward to a large degree with respect to the insertion hole 16a. In such cases, the upper inclined portion 34a of the first rib 34 formed in the insertion strip 32 may contact or interfere with a lower edge 16b of the attachment bracket 16 (FIG. 8). As shown by solid line in FIG. 8, upon interference of the upper inclined portion 34a of the first rib 34 with the lower edge 16b of the attachment bracket 16, the resin cover 30 may be displaced downward with respect to the left side panel 14 (the opening 14a). As a result, as shown by solid line in FIG. 9, the clip 50 (the engagement projection 50a) may also be displaced downward with respect to the attachment hole 20a formed in the bracket 20. This means that the engagement projection 50a of the clip 50 cannot be fitted into the attachment hole 20a of the bracket 20. Therefore, the resin cover 30 cannot be attached to the left side panel 14. Thus, a wrong or insufficient attached condition of the resin cover 30 can be prevented.

Figure 10:
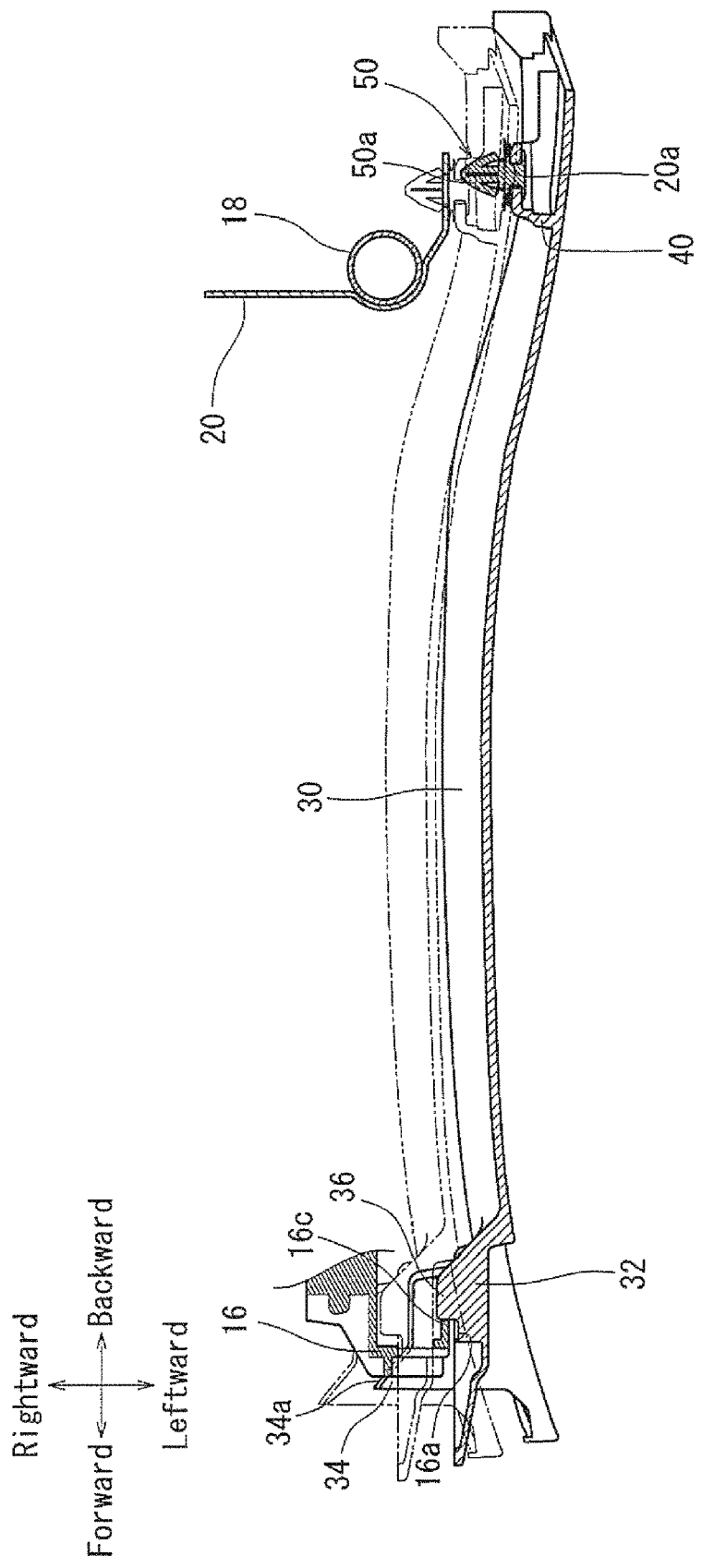
FIG. 10 is a view similar to FIG. 5, which shows a condition in which the resin cover cannot be attached to the panel because the insertion strip is not inserted into the insertion hole while the insertion strip is slightly displaced (leftward) with respect to the insertion hole.
Figure 11:
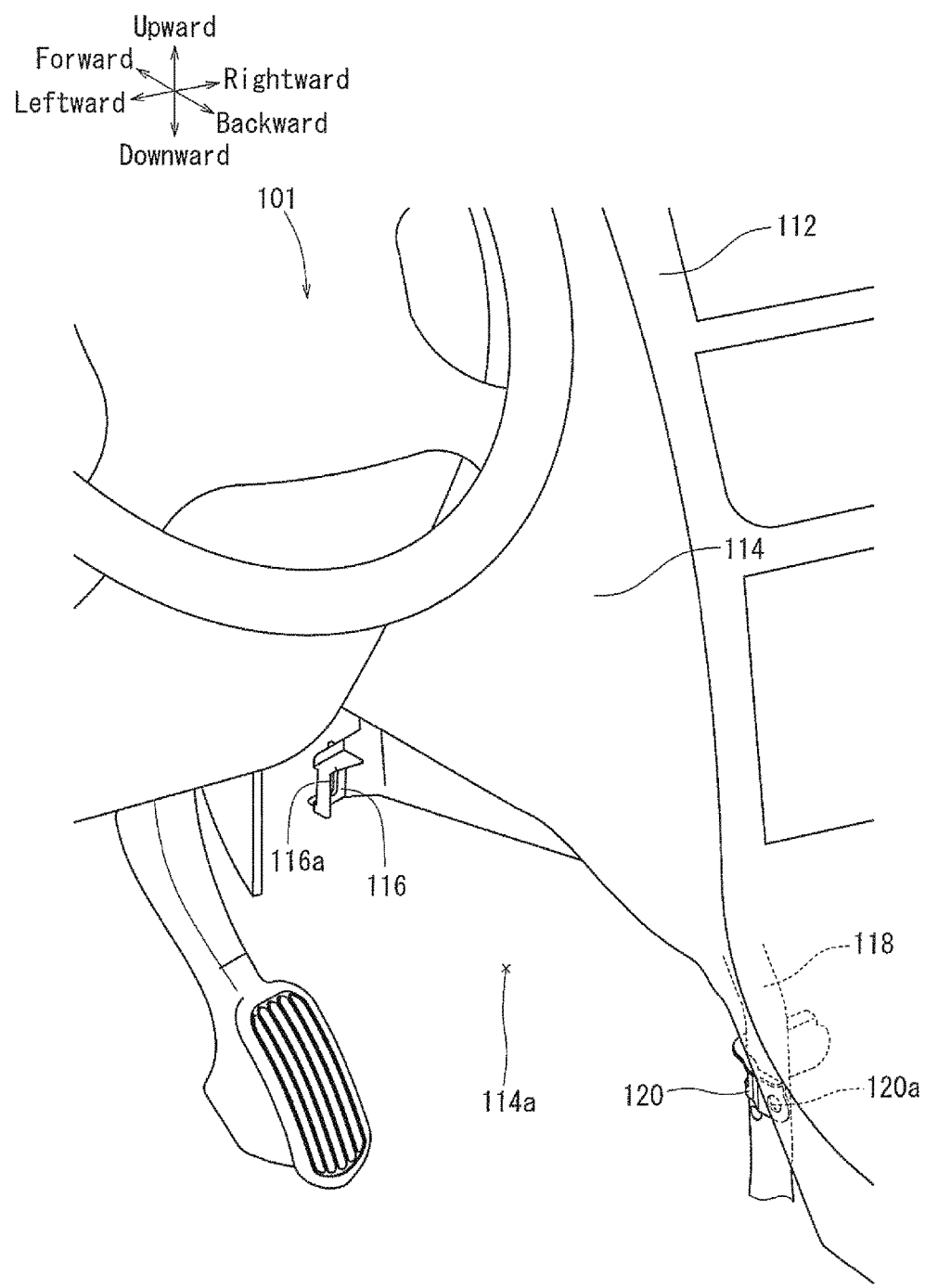
FIG. 11 is a perspective view of a vehicle cockpit having a panel to which a conventional resin cover is to be attached, which shows a condition in which an opening formed in the panel is not closed by the resin cover.
Figure 12:
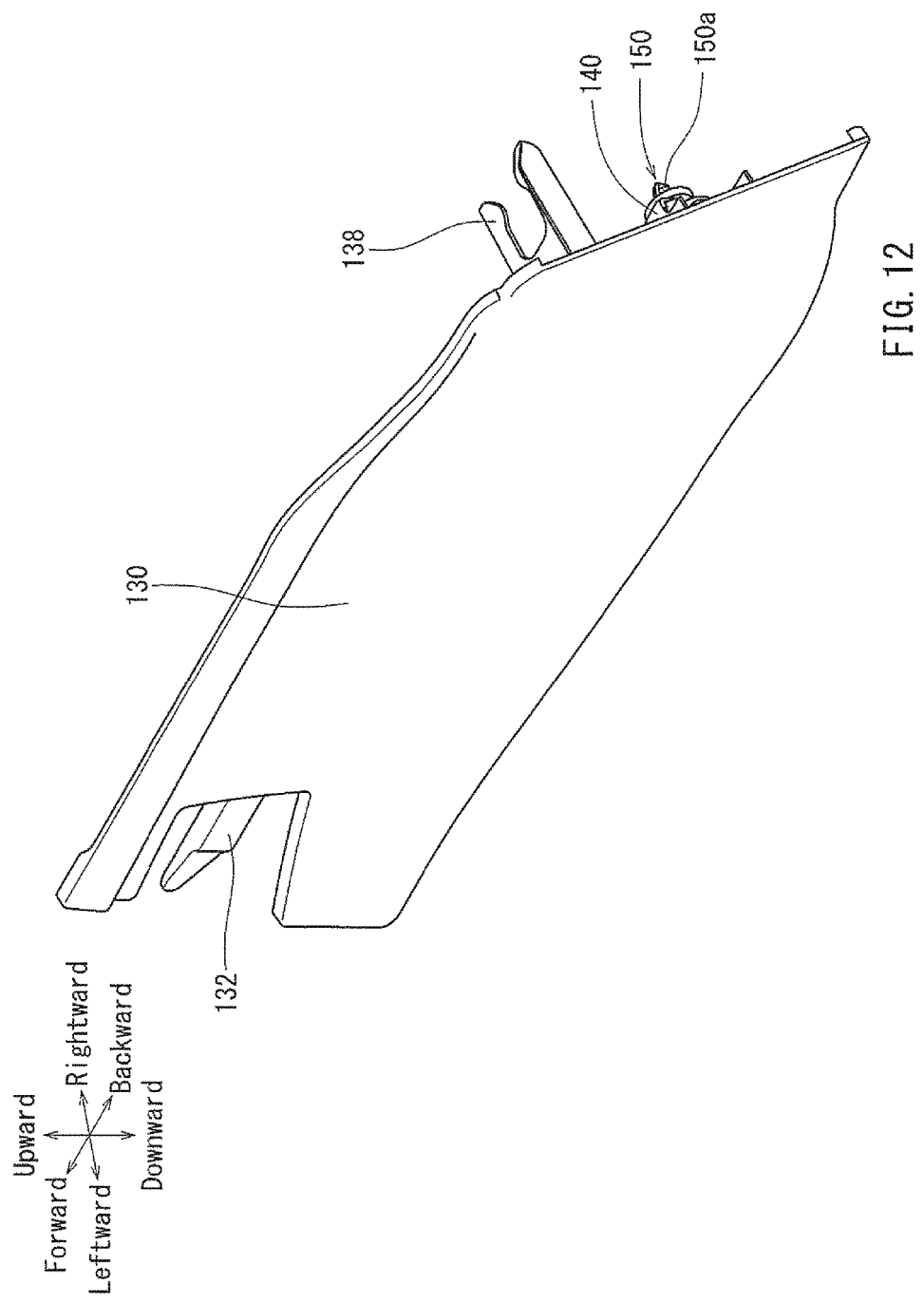
FIG. 12 is an enlarged perspective view of the resin cover.
Figure 13:
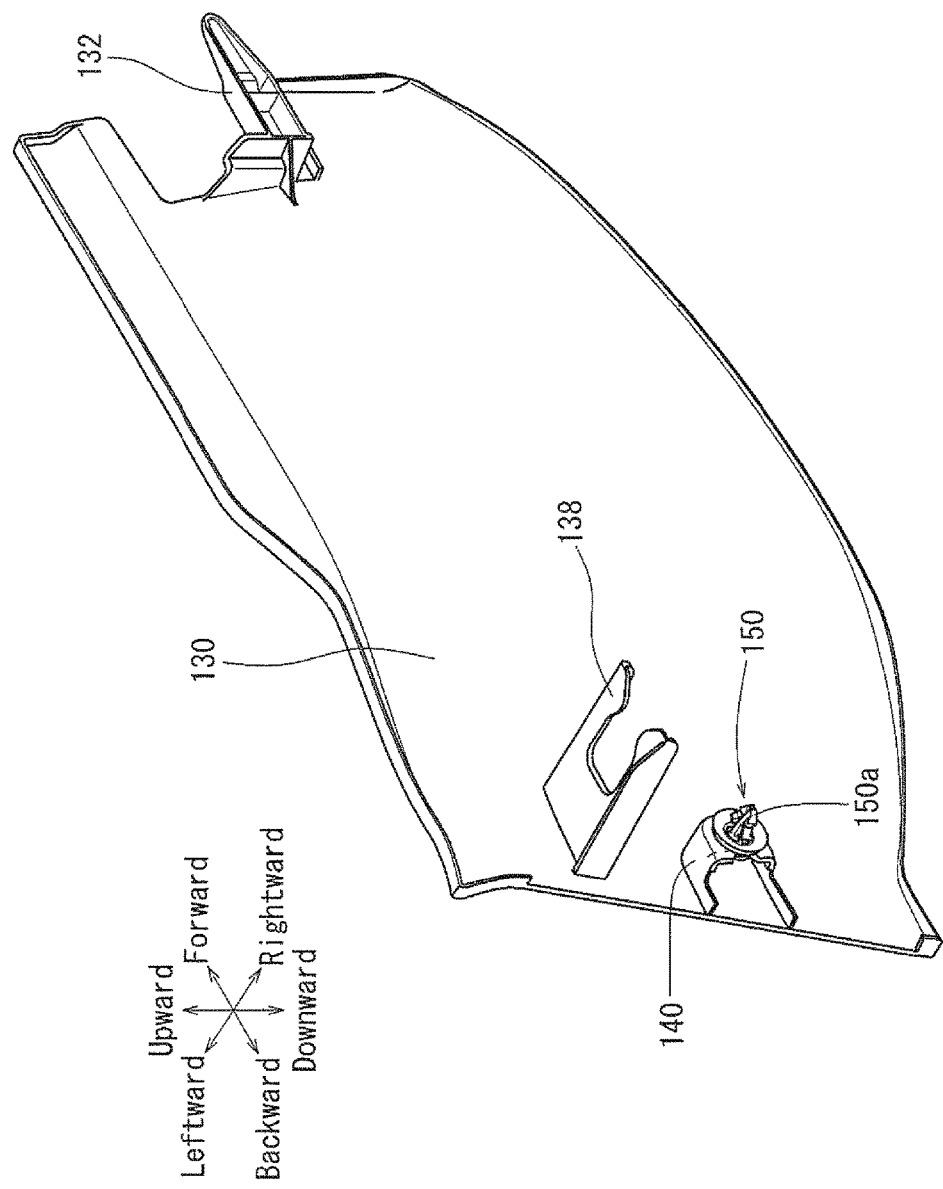
FIG. 13 is a rear view of the resin cover of FIG. 12.
Figure 14:
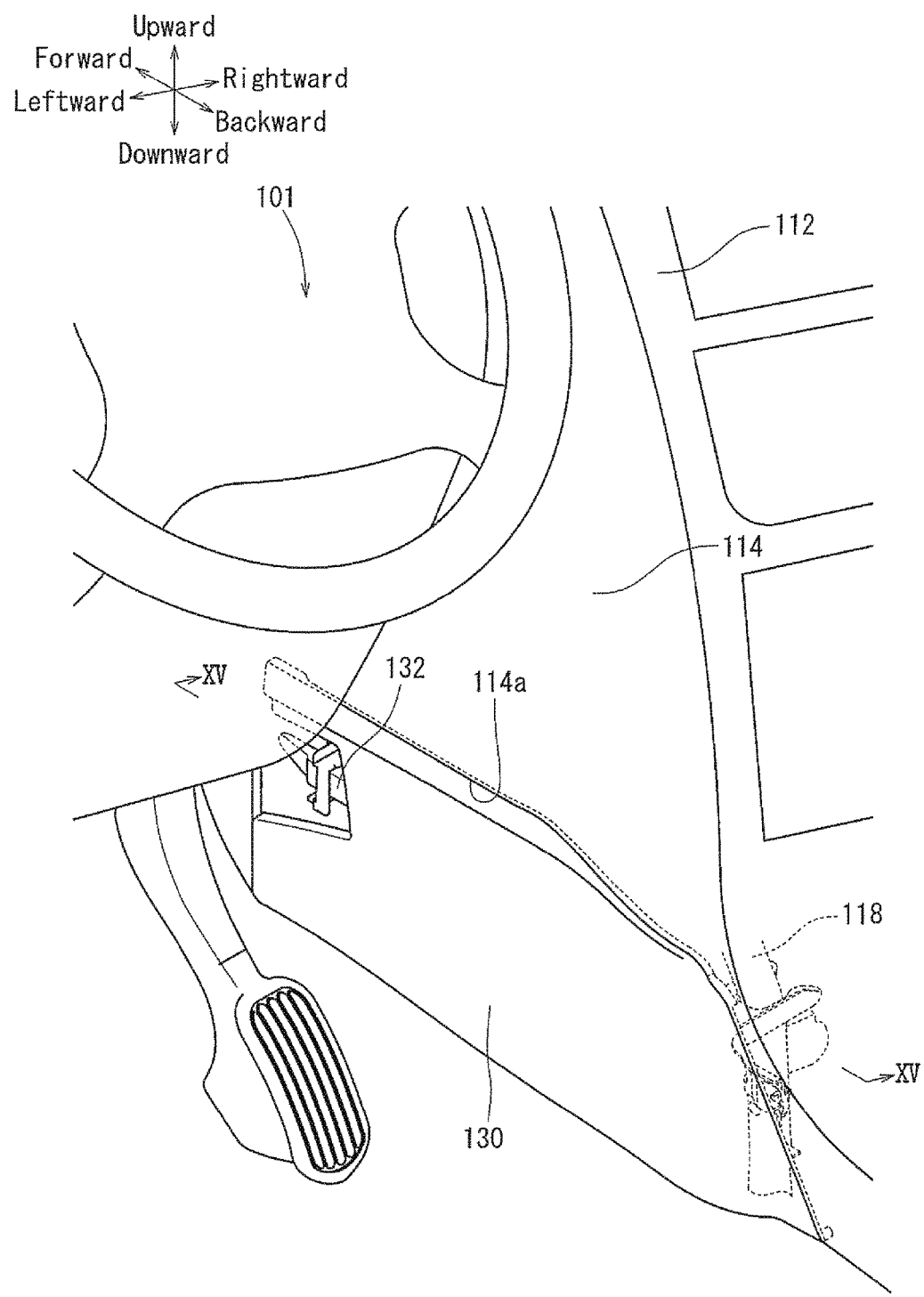
FIG. 14 is a view similar to FIG. 11, which shows a condition in which the resin cover is attached to the panel in order to close the opening formed therein.
Figure 15:
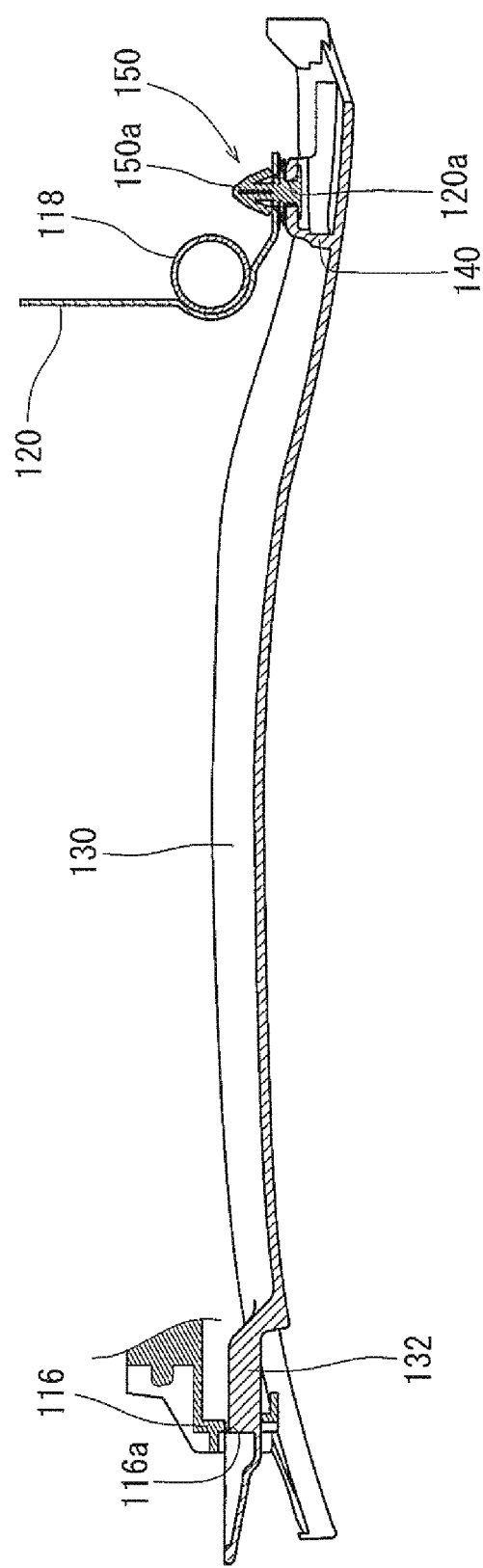
FIG. 15 is a cross-sectional view taken along line XV-XV in FIG. 14.
Figure 16:
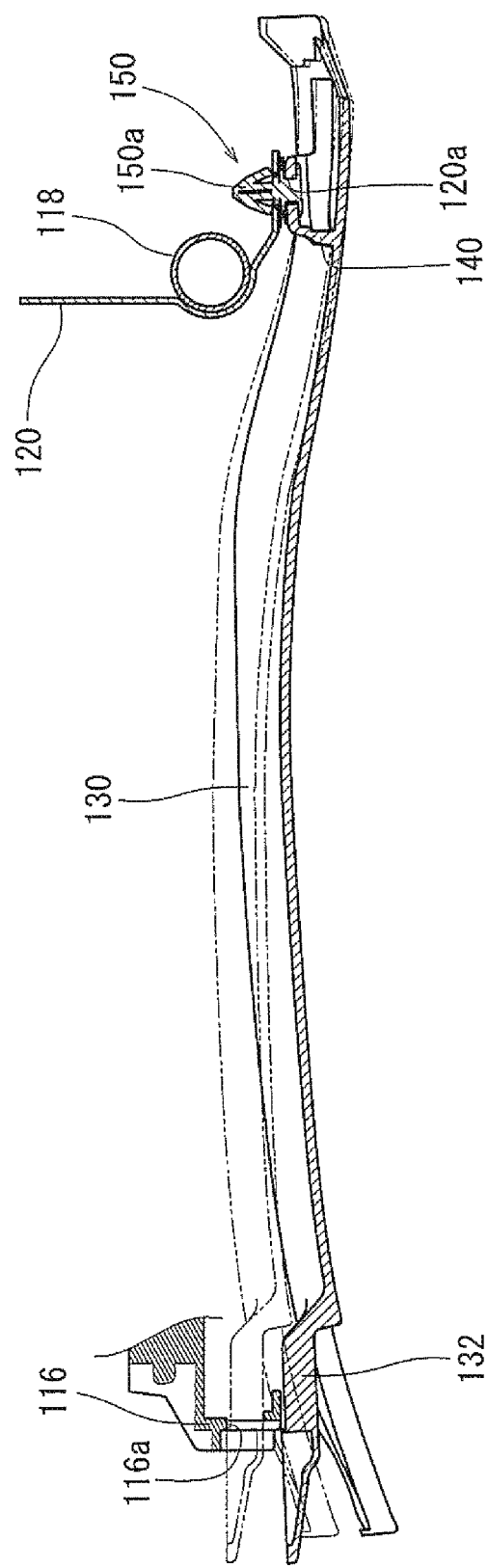
FIG. 16 is a view similar to FIG. 15, which shows a condition in which the resin cover is attached to the panel although an insertion strip formed in the resin cover is not inserted into an insertion hole formed in an attachment bracket.

Also, as shown in FIG. 10, during the insertion operation of the insertion strip 32 into the insertion hole 16a, the insertion strip 32 may sometimes be displaced outward to a small degree with respect to the insertion hole 16a. In such cases, the second rib 36 formed in the insertion strip 32 may contact or interfere with the projection 16c of the attachment bracket 16. As shown by solid line in FIG. 10, upon interference of the second rib 36 with the projection 16c of the attachment bracket 16, the resin cover 30 may be displaced backward (i.e., displaced in an extraction direction of the insertion strip 32 or in a direction opposite to the insertion direction of the insertion strip 32). As a result, the clip 50 (the engagement projection 50a) may be displaced backward with respect to the attachment hole 20a formed in the bracket 20. This means that the engagement projection 50a of the clip 50 cannot be fitted into the attachment hole 20a of the bracket 20. Therefore, the resin cover 30 cannot be attached to the left side panel 14. Thus, the wrong or insufficient attached condition of the resin cover 30 can be prevented.

As described above, when the insertion strip 32 of the resin cover 30 is not inserted into the insertion hole 16a of the attachment bracket 16 due to lateral displacement of the insertion strip 32 with respect to the insertion hole 16a, the resin cover 30 cannot be attached to the left side panel 14 because the engagement projection 50a of the clip 50 can be prevented from being fitted into the attachment hole 20a of the bracket 20 by the presence of the first rib 34 and the second rib 36 formed in the insertion strip 32. That is, the resin cover 30 cannot be attached to the left side panel 14 unless the insertion strip 32 is not inserted into the insertion hole 16a. As a result, the wrong or insufficient attached condition of the resin cover 30 can be effectively prevented.

Various changes and modifications may be made to the present disclosure without departing from the scope thereof. For example, in the embodiment, the resin cover 30 is configured to close the opening 14a formed in the left side panel 14. However, the resin cover 30 may be changed to close the opening 14a formed in the right side panel 14. As will be recognized, in such a case, the resin cover 30 may be modified so as to have a shape symmetrical to the resin cover 30 described therein.

Further, the disclosed embodiment is applied to the resin cover 30 that is configured to close the opening 14a formed in the left side panel 14 of the center cluster 12. However, the other embodiments may be applied to various resin covers other than the resin cover 30.

Further, in the resin cover 30 of the disclosed embodiment, the first rib 34 is formed in the lower portion of the insertion strip 32. However, the first rib 34 may be formed in an upper portion of the insertion strip 32. As will be appreciated, in such a case, unlike the embodiment, the first rib 34 may have a lower inclined portion instead of the upper inclined portion 34a. Therefore, during the insertion operation of the insertion strip 32 into the insertion hole 16a, when the insertion strip 32 is displaced outward to a large degree with respect to the insertion hole 16a, the lower inclined portion of the first rib 34 may contact or interfere with an upper edge of the attachment bracket 16. As a result, the resin cover 30 may be displaced upward with respect to the left side panel 14 (the opening 14a), so that the engagement projection 50a of the clip 50 can be prevented from being fitted into the attachment hole 20a of the bracket 20. Naturally, such a modified form may provide the same effect as the disclosed embodiment.

A representative example has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples. Moreover, the various features taught in this specification may be combined in ways that are not specifically enumerated in order to obtain additional useful embodiments.

What is claimed is:

1. A resin cover having a longitudinal axis, comprising:
   an insertion strip projecting longitudinally and configured to be longitudinally inserted into an insertion hole formed in an object member; and
   a clip projecting laterally and configured to be laterally fitted into an attachment hole formed in the object member;
   wherein the clip is arranged and constructed to be fitted into the attachment hole of the object member while the insertion strip is disposed in the insertion hole of the object member;
   wherein the insertion strip has a first rib formed therein and positioned adjacent thereto; and
   wherein the first rib has an inclined portion inclined in an insertion direction, and
   wherein the inclined portion is configured to interfere with the object member when the insertion strip is displaced laterally with respect to the insertion hole and misinserted thereinto during an insertion operation of the insertion strip into the insertion hole, so as to displace the clip substantially upward or downward with respect to the attachment hole.

2. The resin cover of claim 1, wherein the insertion strip has a second rib formed in an inner surface thereof, and wherein the second rib is configured to interfere with the object member when the insertion strip is displaced laterally with respect to the insertion hole and misinserted thereinto during the insertion operation of the insertion strip into the insertion hole, so as to hold the clip in a position that is displaced in an extraction direction of the insertion strip with respect to the attachment hole.

3. An attaching structure for attaching a covering member to an attaching base, the covering member having a longitudinal axis and the attaching structure comprising:
   an insertion strip formed in the covering member and projecting longitudinally;

a first rib formed in the insertion strip and extending therefrom in a lateral direction; and an insertion hole formed in the attaching base;

wherein the insertion strip is configured to be inserted into the insertion hole in a longitudinal direction;

wherein the first rib has an inclined portion that is inclined in an insertion direction of the insertion strip; and wherein the inclined portion of the first rib is configured to selectively interfere with the attaching base due to misinsertion of the insertion strip caused by lateral displacement of the insertion strip with respect to the insertion hole during an insertion operation of the insertion strip into the insertion hole, so as to vertically displace the covering member with respect to the attaching base.

4. The attaching structure of claim 3 further comprising a second rib formed in the insertion strip and extending therefrom in the lateral direction, wherein the second rib is configured to selectively interfere with the attaching base due to misinsertion of the insertion strip caused by lateral displacement of the insertion strip with respect to the insertion hole during the insertion operation of the insertion strip into the insertion hole, so as to hold the covering member in a position that is displaced with respect to the attaching base in a direction opposite to the insertion direction of the insertion strip.

5. The attaching structure of claim 3, wherein the insertion hole is formed in an attachment bracket formed in the attaching base, and wherein the inclined portion of the first rib is configured to interfere with the attachment bracket.

6. The attaching structure of claim 4, wherein the insertion hole is formed in an attachment bracket formed in the attaching base, wherein the attachment bracket has a projection projected in the direction opposite to the insertion direction of the insertion strip, and wherein the second rib is configured to interfere with the projection.

* * * * *